United States Patent Office 2,759,135
Patented Aug. 14, 1956

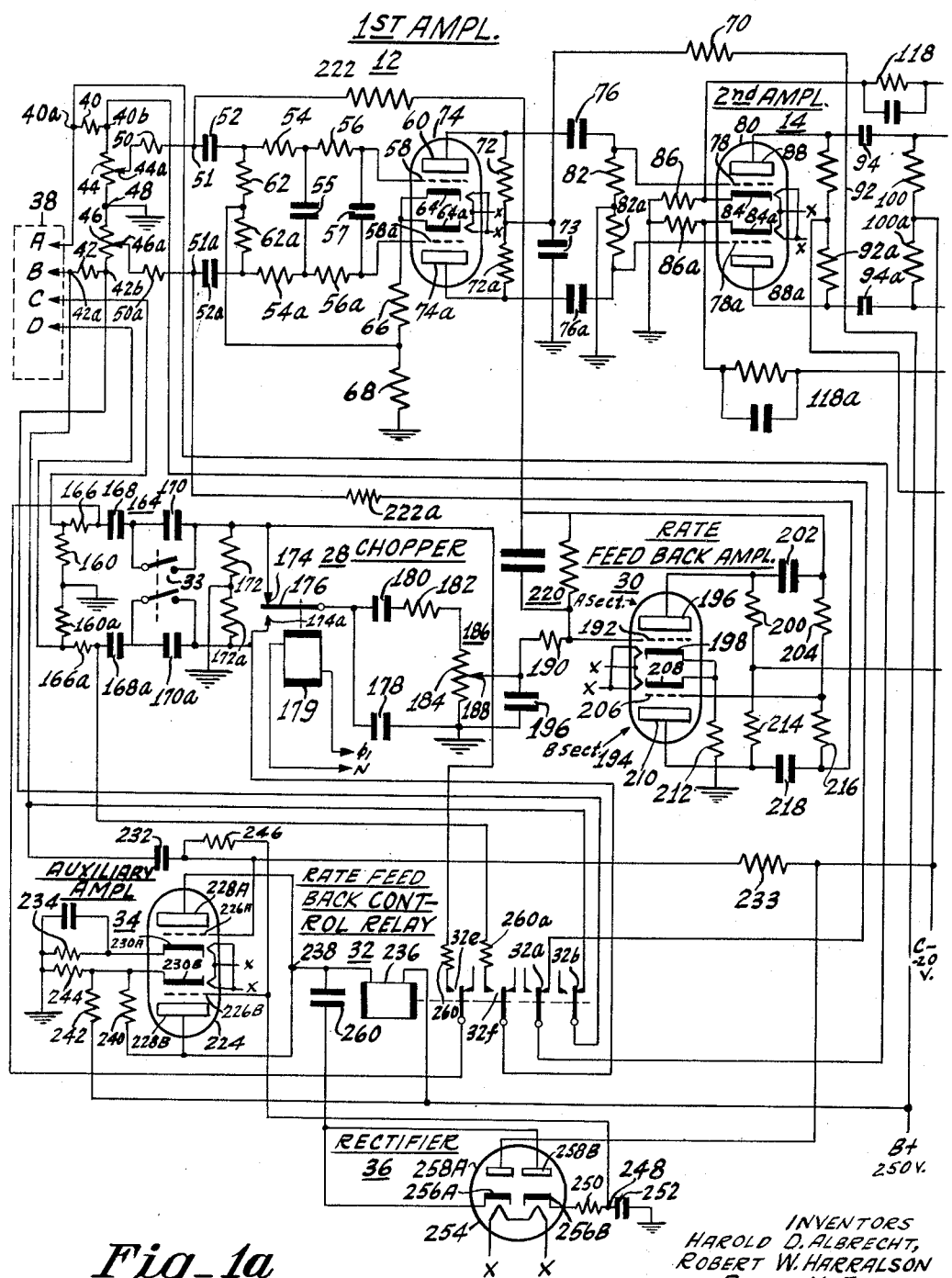
Fig_1a

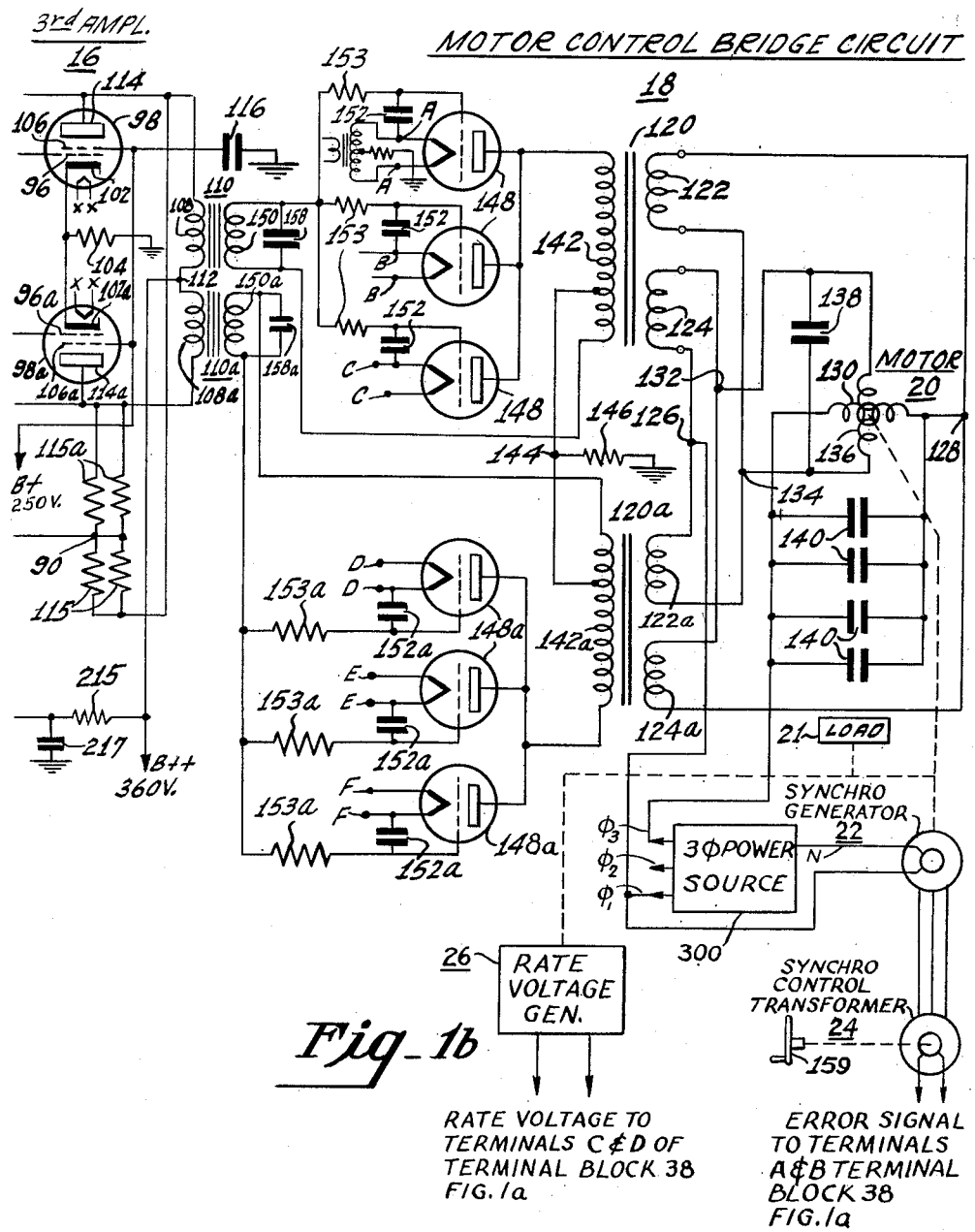
Fig_1b

2,759,135

SERVO SYSTEM WITH FEEDBACK CONTROL

Harold D. Albrecht, Collingswood, Robert W. Harralson, Burlington, and Roger H. Fricke, Haddonfield, N. J., assignors to Radio Corporation of America, a corporation of Delaware Application July 18, 1952, Serial No. 299,564

29 Claims. (Cl. 318—30)

The present invention is related to servo amplifiers and particularly to a servo amplifier having a feedback control circuit.

In servo mechanisms, especially those having a load of fairly large mass or the equivalent, it is frequently desired to move the mass at a very rapid rate to a new position. Under these conditions and especially if the servo amplifier is designed to give close control, the movement of the mass is sometimes not as rapid as may be desired. If the servo amplifier is designed to give this rapid sudden movement of the mass, it will in general not be possible to deadbeat the mass into position and oscillations may result. The present invention provides means for overcoming this disadvantage of servo mechanisms.

Where the servo mechanism is of the position type the sudden large movement of the mass is often termed "slewing." With the means of the invention a rapid slewing action is provided, and at the same time both close control and the desirable positioning action of the servo may be retained and oscillations avoided.

It is an object of the invention to provide a servo mechanism having improved characteristics and particularly improved slewing characteristics without deterioration of the response of the servo system to small error signals.

It is another object of the invention to provide a servo control mechanism which will have an extremely rapid response to large error signals and which will find its proper condition of equilibrium without serious oscillations and especially in which these characteristics will be markedly improved over the like responses of known and conventional servo mechanisms.

In accordance with the invention, in a servo amplifier subject to saturation, for an error signal in excess of a predetermined amplitude, the rate feedback is increased over what it is for lesser error signals. This predetermined amount of error signal is at least equal to or greater than the amount for which the amplifier saturates. Preferably the error signal is also attenuated at the same time that the rate feedback is increased and the combined signal is still maintained at a level above or near the saturation level of the amplifier. As a result of the increased rate feedback, even though the load travels at a high velocity (in the case of a position servo), it is decelerated more rapidly because of the braking action or damping due to the increased rate feedback. As the error signal decreases sufficiently and the load nears its position of equilibrium, the normal level of rate feedback signal and error signal is restored, so that the load is quickly brought to its position of equilibrium without serious oscillations. The application of the proper rate signal level and error signal level is readily controlled by a relay. When the error signal reference exceeds a predetermined amount, a rate feedback control relay is actuated. The contacts of the rate feedback control relay are arranged in a circuit to increase the rate feedback when the relay is actuated and at the same time attenuate the error signal applied to the servo amplifier. Similarly, when the error signal level falls below a certain amount, which is not necessarily the same as the predetermined amount at which the relay is actuated, the application of the error signal and the rate signal is restored to normal condition.

The foregoing objects and other objects, advantages and novel features of the invention will be more apparent from the following description when taken in connection with the accompanying drawing in which Fig. 1a and 1b taken together is a circuit diagram schematically illustrating an embodiment of the invention.

OVER-ALL SYSTEM

Fig. 1a may be laid to the left of Fig. 1b and in alignment therewith so that corresponding numbered leads meet. Considering the overall system illustrated, a motor 20 is to position a load 21 into positional correspondence with a handwheel 159. The load 21 is mechanically driven by the motor shaft which is also mechanically connected to the rotor of a first selsyn or synchro generator 22. Therefore the rotor of synchro generator 22 is positioned in correspondence to the load position. A second selsyn or synchro control transformer 24 has its rotor positioned by a handwheel 159. Any lack of positional correspondence between the handwheel and the load, that is, between the rotor of synchro control transformer 24 and the rotor of synchro generator 22 results in an error signal at the rotor of synchro control transformer 24. The error signal corresponds in sense (which in this case is signal phase) and amplitude to the lack of positional correspondence between the load 21 and the handwheel 159.

The path of the error signal as modified by a rate signal (discussed hereinafter) is through three stages of amplification indicated as first, second, and third amplifiers 12, 14 and 16 respectively. The output of the third amplifier is applied to a motor control bridge circuit 18 which controls the rate and direction of rotation of the shaft of the motor 20. The motor shaft drives the rotor of the synchro control generator 22 to reduce the error signal and thus bring the load 21 into positional correspondence with the handwheel 159.

The rate signal is derived from a rate voltage generator 26 which also may be driven by the motor shaft and which provides a voltage which is converted in a chopper 28 into an alternating voltage. The alternating rate voltage is amplified in a rate feed-back amplifier from whence it is applied to the input of the first amplifier. The rate feedback control relay 32 is controlled by an auxiliary amplifier 34 together with a rectifier 36 so that at a predetermined level of the error signal, a portion of which is applied to this auxiliary amplifier, the rate feed-back control relay 32 is actuated.

When the rate feedback control relay is actuated, the circuit values of a filter circuit preceding the chopper 28 are in effect modified to provide a substantially lower impedance at significant rate voltage frequencies than the filter otherwise has in its normal operating condition. This enhancement of rate feedback is accomplished because the rate feedback control relay parallels a filter circuit in the rate feedback loop with resistors. This decreases the impedance at significant rate voltage frequencies to the application of the rate voltage to following circuit elements. Consequently, the voltage applied to the chopper 28 is enhanced or increased over what its value would be if the relay were not actuated. As a result, the rate feedback is increased. The same rate feedback control relay when actuated inserts attenuating resistances in series with the error signal path which attenuating resistors are short-circuited by rate feedback control relay contacts when this relay is not actuated. Therefore, upon actuation of the rate feedback control relay, the error signal itself is attenuated or diminished below the value it would have otherwise. The rate feedback control relay circuit is designed so that the relay is deactuated for error signals of decreasing amplitude at a substantially lower amplitude error signal than is required to actuate it, for reasons disclosed hereinafter.

DETAILED DESCRIPTION

A. *First, second, and third amplifiers*

The error signal is applied to terminals A and B of a terminal block 38 to a substantially symmetrical circuit with respect to a common ground connection conventionally indicated. The push-pull signal is applied between terminals 40a and 42a of attenuating resistors 40 and 42 respectively. These attenuating resistors 40 and 42 are normally short-circuited through contacts 32a and 32b of the rate feedback control relay 32. The other terminals 40b and 42b respectively, of resistors 40 and 42 are connected to one terminal respectively of balancing potentiometers 44 and 46. The other terminals of the potentiometers 44 and 46 are connected at a junction 48 to a common ground connection conventionally indicated. The taps 44a and 46a of the balancing potentiometers 44 and 46 are connected to resistors 50 and 50a respectively. Resistor 50, a capacitor 52, a resistor 54 and another resistor 56 are connected in series to one grid 58 of a double triode 60. As the push-pull circuit is symmetrical, corresponding elements to which the opposite polarity signals are applied, and which are similarly connected, are designated with the same numerals followed by a small letter a. At the junction between capacitor 52 and resistor 54 a resistor 62 is connected through a resistor 62a to the similar junction between capacitor 52a and resistor 54a. A capacitor 55 is connected between the junction of resistors 54 and 56 and that of resistors 54a and 56a. A capacitor 57 is connected between the junction of resistor 56 and grid 58 and that of resistor 56a and grid 58a. Cathodes 64 and 64a of the twin triode are connected together and through cathode resistors 66 and 68 to ground. The junction between the cathode resistors 66 and 68 is connected to the junction between resistors 62 and 62a. B+ voltage is applied through a suitable voltage dropping resistor 70 to the junction of two anode load resistors 72 and 72a. A filter capacitor 73 is connected to ground from between the junction of the anode load resistors.

The signals developed at the anodes 74 and 74a of the double triode 60 are applied by coupling capacitors 76 and 76a to the grids 78 and 78a of the second amplifier tube, a twin triode 80. A grid resistor 82 is connected between the junction of capacitor 76 and the grid 78 to ground, and a grid resistor 82a is similarly connected at the junction of capacitors 76a and grid 78a. Each cathode 84 and 84a of the twin triode 80 is connected through its own cathode resistor 86 and 86a respectively to ground. The anode voltage supply for the anodes 88 and 88a is derived from a junction 90, as will appear more fully hereinafter, through anode load resistors 92 and 92a. The signal developed across the second amplifier anode load resistors 92 and 92a is coupled by block coupling capacitors 94 and 94a to the control grids 96 and 96a of a pair of tetrodes 98 and 98a. Resistors 100 and 100a are connected as grid resistors respectively at the junctions between capacitor 94a and grid 96a. A suitable grid bias negative with respect to ground and designated C— is applied to the other terminals of the grid resistors 100 and 100a. The tetrode cathodes 102 and 102a are connected through a common cathode resistor 104 to ground. A suitable B+ voltage is applied to the screen grids 106 and 106a of the tetrodes 98 and 98a. The primary windings 108 and 108a of a pair of transformers 110 and 110a serve as anode load impedances for the tetrodes 98 and 98a. The primary windings 108 and 108a have a common junction 112 through which high voltage is supplied to the anodes 114 and 114a respectively, through the primary windings 108 and 108a. A pair of parallel connected resistors 115 are connected between the junction 90 and the anode 114, and a similar pair of parallel connected resistors 115a are connected between the junction 90 and the anode 114a. These resistors 115 and 115a thus serve as voltage balancing resistors. Since they are equal in value and the circuit is at least nominally balanced, the junction 90 has substantially no signal voltage applied to it. There is, however, a certain amount of balancing feedback action involved in this connection because it is degenerative to in-phase signals. A filter capacitor 116 is connected between the screen grids 106 and 106a and ground.

A parallel resistor capacitor combination 118 is connected between the anode 114 of the third amplifier tetrode 98 and the cathode 84 of the second amplifier 14. A similar parallel resistor capacitor combination 118a is connected between the anode 114a and the cathode 84a.

In operation, neglecting for the time being the action of the rate feedback control relay which is assumed to be in its normal non-actuated position, a portion of the incoming error signal applied at terminals A and B of terminal block 38 is picked up across the potentiometer taps 44a and 46a. These potentiometer taps are preferably adjusted so that the output of the three stages of amplification at the transformers 110 and 110a are balanced. At the junctions 51 and 51a the rate signal is applied in proper phase to give anticipation. The network comprising the capacitor 52, resistors 54, 56, and 62, and the corresponding resistors numbered with a postscript small a, and shunting capacitors 55 and 57 provide a filter action on the input signal to the first amplifier. This filter action also involves a phase shift. This phase shift is desirable because, as will appear, the error signal and the rate correction are either in or out of phase with a 400 C. P. S. voltage derived between a first phase $\phi_1$ and neutral N of a three phase power supply 300. For the type of motor control circuit employed, however, the error signal as applied to the motor control circuit 18 should be in or out of phase with a voltage supply there used which is derived between the first phase $\phi_1$ and the third phase $\phi_3$ of this three-phased power supply. Therefore, the phase shift should be sufficient to provide a phase correction. In other words, advantage is taken of the fact that a three-phase system is employed to use a filter without the necessity of a phase correction circuit. The filter action thus afforded is highly beneficial to the response of the servo mechanism. Some balancing action is afforded by the connection of the resistor 68 to the junction between resistors 62 and 62a in the first amplifier 12 to degenerate in phase signals.

The action of the second amplifier 14 as a push-pull amplifier will be apparent to those skilled in the art. The peculiarity of this stage resides in the provision of a negative feedback from the anodes 114 and 114a of the third stage through the resistor-capacitor combinations 118 and 118a respectively, to the cathodes 84 and 84a. The third amplifier stage provides also a push-pull output, as will be apparent to those skilled in the art, with some balancing action due to the effect of the feedback from the junction 90 as explained heretofore. Therefore, the output currents from the third amplifier 16 through the primaries 108 and 108a of transformers 110 and 110a is a balanced push-pull output. This output will be substantially proportional to the amplitude of the error voltage as modified by the rate voltage and will be either in or out of phase with the voltage from $\phi_1$ to $\phi_3$ of the three-phased power supply, according to whether the error voltage as modified by the rate voltage is in or out of phase with $\phi_1$. Further, because of the push-pull arrangement, it is readily shown that if the error voltage (as modified by the rate correction voltage) between junctions 51 and 51a reverses in phase, the output currents in the primaries 108 and 108a also reverse in phase.

B. *Motor control bridge circuit*

The motor control bridge circuit 18 is similar to the motor control bridge circuit described in the patent to R.

Lesnick 2,411,608, November 26, 1946, or that described in Patent 2,598,922 to A. E. Konick et al., and operates in a similar manner. Two output transformers 120 and 120a, have a split primary, windings 122 and 122a and 124 and 124a respectively. The primary windings 122 and 122a and 124 and 124a are connected in a bridge circuit. One terminal of the bridge circuit 126, which is the junction between primary winding 122a and winding 124 of transformer 120, is connected to one phase $\phi_1$ of the power supply. The conjugate terminal 128 of the bridge is connected through a winding 130 of motor 20 to another phase $\phi_3$ of the power source. The other pair of conjugate terminals 132 and 134 of the bridge circuit are connected across the other winding 136 of the motor 20. In parallel with the winding 136 is connected a capacitor 138 and in parallel with the other motor winding 130 are connected in parallel capacitors 140. The transformers 120 and 120a each has a secondary winding 142 and 142a respectively. Suitable taps on these secondary windings are connected together at a junction 144. A resistor 146 is connected between the junction 144 and ground. One terminal of the winding 142 is connected to the anodes of three parallel connected output tubes 148. The other terminal of the winding 142 is connected through the secondary winding 150 of the transformer 110 to the grids of the tubes 148 providing alternating current bias for these tubes. One resistor of resistors 153 is in series with each separate grid lead as a parasitic suppressor with capacitors 152. Each of tubes 148 and 148a is provided with its own filament secondary winding, such as 154 all coupled to a common primary. Each winding 154 is connected through a cathode resistor 156 to ground. This arrangement is desired, as it tends to equalize cathode bias and current through all the tubes, and also provides a separate filament winding for each tube, so that if only one burns out, the equipment may still operate. It is apparent that the arrangement of filament transformers for tubes 148a and of output transformer 120a and the transformer 110a is similar to that for tubes 148, transformer 120, and transformer 110 respectively, and need not be described in detail. The secondaries 150 and 150a of the transformers 110 and 110a are paralleled by capacitors 158 and 158a respectively to store up the pulse of signal or bias voltage which comes thru the amplifier under saturated condition, as when slewing, to provide signal or bias over the entire half cycle, thereby maintaining full motor torque for all signal levels above the minimum necessary for full torque.

The operation of the motor control bridge circuit is similar to that described in the above mentioned patents, and is here described in a simplified fashion. Signals on the secondary windings 150 and 150a result in the application of signals on the grids of the tubes 148 and 148a which are in push-pull with respect to each other and either in or out of phase with the voltage applied to the anodes by way of the transformers 120 and 120a. If these push-pull signals applied to the grids are equal or balanced then the flow of current through the bridge windings 122, 124, and 122a and 124a is equal, the bridge is in balance, and there is no net current through the winding 136 of the motor 20. If, however, the bridge is unbalanced so that greater signal is applied, for example, to the grids of tube 148, then excess current flows through the winding 136 and in one phase which causes the motor to run in one direction; whereas with an unbalance by a greater signal on the grids of tubes 148a reverse unbalance causes excess current to flow in the other direction through winding 136 in the other phase which causes the motor to run in the reverse direction.

The currents through the windings 130 and 136 should have about a 90 degree phase relationship. However, with a 400 cycle supply the motor employed does not have a near unity power factor. The reason for the capacitors 138 and 40 may be indicated in a qualitative fashion. Ideally, one would desire the motor to have a power factor of about 70 percent on each winding. For this reason each winding is paralleled by one capacitor, in this instance of about 37 mf. (microfarads). However, winding 130 is paralleled by additional capacitors to make the total capacity thus connected across it about 94 mf. (including the 36 mf. already shunted across this winding). The current through winding 130 is therefore phased about 90 degrees with the current through winding 136, and the power factor of the motor is also corrected. Ordinarily, for motors of lower frequency used in this type of equipment, for example 30 or 60 cycle motors, the power factor departure from the ideal is not sufficiently important to warrant correction by this means.

C. *Error and rate signals*

The shaft of motor 20, by mechanical connection, positions the rotor of a synchro generator 22. To the rotor of the synchro generator 22, as explained heretofore, is applied the voltage between the first phase $\phi_1$ and the neutral N of the three-phased power supply. The stator of synchro generator 22 is electrically connected to the stator of synchro control transformer 24. The error signal which is applied to terminals A and B of the terminal block 38 is taken from the rotor of the synchro control transformer 24. The rotor of the synchro control transformer 24 may be positioned manually, as desired, by a hand-wheel 159. The shaft of motor 120 also drives a rate voltage generator which may be a D.-C. generator. The polarity of voltage from rate generator 26 therefore depends on the sense of rotation of motor 20 or direction of drive of load 21. The amplitude of the rate voltage is preferably directly proportional to the speed of motor 20 or the drive of load 21.

The output of the rate voltage generator is applied to terminals C and D of terminal block 10. It will be understood from what has been said heretofore that when the hand-wheel 159 moves the rotor of the synchro control transformer 24 to a desired position, a signal is generated in that rotor. This signal, modified by the rate voltage in a manner described in detail hereinafter, passing through the three amplifiers heretofore described in detail, and the bridge circuit 18, causes the motor to drive the rotor of synchro generator 22 to a position of correspondence with the rotor of synchro control transformer 24.

D. *Rate feedback circuit*

From the terminals C and D of terminal block 38, the rate voltage is applied across two serially connected resistors 160 and 160a. The junction between the resistors is grounded. The rate signal developed across the two resistors then passes through a filter circuit 164. The filter circuit includes serially connected resistor 166 and capacitors 168 and 170 which are connected between the ungrounded terminal of resistor 160 and one terminal of a resistor 172. A similar serially connected resistor 166a and capacitors 168a and 170a are connected between the ungrounded terminal of resistor 160a and one terminal of a resistor 172a. The other terminals of resistors 172 and 172a are grounded. As understood in the art, the filter circuit values, especially of capacitors 168, 168a, 170, and 170a, are so selected that rate feedback is applied only with a change of speed of load 21, and so that the desired smooth and anticipatory response is secured under normal operating conditions. These values depend largely on the mechanical inertia of the load 21. The chopper 28 has two fixed contacts 174 and 174a to which connection is alternately made by a vibrating arm 176 actuated by a relay winding 179. The relay is actuated so that the arm 176 vibrates at a rate corresponding to the frequency of the voltage applied to the winding which rate is 400 cycles in this example. The voltage applied to the winding 179 is that between phase $\phi_1$ and N (neutral) of the three phased power supply. The voltage thus picked up by the arm 176 from the filter arrangement 164 is further filtered by a capacitor 178 connected in parallel across a serially connected capacitor 180, resistor 182 and the resistance 184 of a potentiometer 186. The junction of the capacitor 178 and resistor 184 is grounded. The junction of the two capacitors 178 and 180 receives the rate voltage from the chopper arm. The movable potentiometer tap 188 is adjusted to pick up an optimum amount of the rate voltage as a voltage with respect to the ground of the potentiometer resistor 184. The single ended rate voltage so picked up is applied through a resistor 190 to one grid 192 of a double triode 194. A capacitor 196 connected between the potentiometer tap 188 and ground provides a further filter action for the rate voltage.

The double triode 194 is connected in a push-pull self inverter stage. The portion of the resistor 184 between potentiometer tap 188 and ground serves as grid return for the grid 192. The signal on the grid 192 causes a signal to be developed on the anode 196 of the A section of the double triode tube 194. The A section includes the grid 192, anode 196 and cathode 198. This signal on grid 192 as amplified is developed across an anode load resistor 200 through which anode voltage is supplied from the B+ supply. This signal at anode 196 is applied through capacitor 202 and resistor 204 to the grid 206 of the other B section of double triode tube 194 which includes the grid 204, the cathode 208, and an anode 210. The cathodes 198 and 208 are connected through a common cathode resistor 212 to ground. The signal on the grid 206 develops a voltage at anode 210 across the load resistor 214 through which anode voltage is supplied to anode 210. A resistor 216 has one terminal connected to the grid 206 and the other terminal connected through a capacitor 218 to the anode 210. A parallel-connected resistor-capacitor combination 220 provides some negative feedback from the anode 196 through the capacitor 202 to the grid 192.

The operation is such that the D.-C. rate voltage is first filtered and converted into a 400 C. P. S. signal voltage by the chopper. The thus converted rate voltage is applied to grid 192, causing a signal to be developed at the anode 196 of inverted waveform, which inverted waveform is applied through capacitor 202 and resistor 204 to the grid 206. From another viewpoint the resistors 204 and 216 operate as a voltage divider across load resistor 200 and 214 to divide the push-pull voltages developed at the anodes 196 and 210 and applied through the capacitors 202 and 218 respectively. These resistors 204 and 216 are so proportioned in value that the voltage applied at grid 206 is a small proportion of the total push-pull signal voltage, and is applied in such polarity to the grid 206 that the grid voltages are in push-pull relationship. The feedback to effect the push-pull relation at the output is aided by the common cathode resistor 212, which tends to equalize the currents of the two sections of the double triode 194.

The push-pull output of the rate feedback amplifier is applied through capacitors 202 and 218 and through attenuating resistors 222 and 222a respectively to the junctions 51 and 51a. The connection is made in a sense or phase, so that the proper anticipation effect (so-called) is achieved because of the rate feedback voltage. When the rate feedback voltage changes sense, or polarity, the rate feedback voltage at arm 176 of the chopper changes sense, or phase. It should be noted that junctions 51 and 51a to which the rate feedback voltage is applied is at a point near or at the input of the error voltage. In this way the rate feedback voltage modifies the error voltage before the latter has been phase shifted by the filter network. Therefore, the rate feedback voltage and the error voltage are preferably substantially either in phase or out of phase. It will be noted that both the relay winding 179 as well as the error voltage derived from the first selsyn 22 (Fig. 1b) are in or out of phase with the voltage between the power supply phase $\phi_1$ and N.

E. *Rate feedback control relay*

The auxiliary amplifier 34 of Fig. 1a includes a double triode tube 224, which has sections A and B. The A section elements of tube 224 include a grid 226A, an anode 228A and a cathode 230A. The A section grid 226A receives through a blocking capacitor 232 a portion of the error voltage from terminal B of terminal block 38. It will be noted that the voltages between terminals A and B are substantially balanced with respect to the common ground connection by virtue of the ground connection of junction 48. Bias for the grid 226A is applied through a grid resistor 233. Cathode bias for the A section of tube 224 is provided by the resistor capacitor combination 234 connected between cathode 230A and ground. Anode voltage for the anode 228A of the A section and anode 228B of the B section is supplied through the winding 236 of relay 32. The relay winding 236 acts as a load impedance for both anodes 228A and 228B, which are connected together at a junction 238. Any voltage developed across the winding 236 is supplied as a positive feedback signal to the cathode 230B through a resistor 240. Positive cathode bias is applied from the B+ supply to cathode 230B by virtue of the voltage dividing action between resistor 242 through which the B+ is supplied to the cathode 230B and the cathode resistor 244 between the cathode 230B and ground. Negative bias is supplied to the grid 226B through a resistor 246. The grid 226B is also connected to receive a rectified voltage from the rectifier 36 at a junction 248 between a resistor 250 and a capacitor 252 the other terminal of the latter being connected to ground.

The rectifier 36 includes a double diode 254 having two sections, one of which has a cathode 256A and an anode 258A. The other section of the double diode includes a cathode 256B and an anode 258B. The voltage to be rectified is developed across winding 236 and is applied through a capacitor 260 to the cathode 256A and the anode 258B which are connected together. The anode 258A is connected to the negative C— bias supply which may be assumed fixed so that any A.-C. voltages are filtered out.

In operation the auxiliary amplifier 34 and the rectifier 36 cooperate, as mentioned heretofore, to cause the rate feedback control relay to be actuated when the error signal reaches a certain level. First, it may be assumed that the rate feedback control relay 32 is not actuated. The capacitor 232 applies signals to the A section of the auxiliary amplifier 34. These signals cause the A section of tube 34 to conduct through the load which includes the relay winding 236. However, the D.-C. conduction of the A section by itself is not sufficient to actuate the relay. The B section is held biased to cut-off by the positive cathode bias and the negative grid bias hereinbefore mentioned. However, the additional bias supplied to the grid 226B by the rectifier 36 is applied in a polarity which causes the grid 226B to become more positive as the rectifier action increases. When the A.-C. voltage developed across the winding 236 is below a certain limit, the rectified voltage applied from the rectifier 36 to the grid 226B to make that grid more positive is not sufficient to cause the B section of tube 224 to conduct.

However, suppose that the error voltage, and the voltage at grid 226A reaches a certain predetermined level or amplitude. A larger signal is now developed across the load of the relay winding 236. This signal is applied through the capacitor 260 and causes D.-C. conduction in the rectifier (following conventional as distinguished from electron current flow) from the anode 258A to the cathode 256A, thence to the anode 258B, thence to the cathode 256B, thence through the resistors 250, 246 and 233 and back to anode 258A. The connection of the left-hand section A of rectifier tube 254 to the C— bias supply acts as a sort of clamping device. By this means, the voltage at junction 248 in the rectifier circuit increases in a positive direction above a certain negative voltage with increased amplitude of the signal from capacitor 260. At the predetermined level or amplitude of the error signal, the voltage through capacitor 260 is sufficient to cause the D.-C. voltage developed at junction 248 to raise the auxiliary amplifier grid 226B to a conductive value for the B section of tube 224. As a result, the B section of tube 224 also starts to conduct and may also amplify somewhat by virtue of the regenerative feedback path through resistor 240 in such a way that the A.-C. voltages developed across the load of the relay winding 236 by the two sections of tube 224 are in aiding or in-phase relationship. This action rapidly causes the D.-C. current through the two sections of tube 224 which passes through the winding 236 to reach a value sufficient to actuate the relay 236.

Once this value is reached and after the relay 32 has been actuated, suppose the error signal to decline in value. It will be fairly apparent to those skilled in the art that due to the fact that feedback will continue through the resistor 240, and that as long as it continues the capacitor 260 will feed a larger voltage to the rectifier 36 than if only one section of tube 224 were conducting, the error signal must decline to an amplitude below the above mentioned predetermined amplitude before the B section of tube 224 will be cut off. Accordingly, the auxiliary amplifier 34 and rectifier 36 provide a means which actuate the rate feedback control relay 32 at a predetermined amplitude of the error signal and which causes the relay to be non-actuated or de-actuated, as the error signal amplitude declines or decreases from said predetermined level to a second predetermined level below the first. However, when increasing from below the second predetermined amplitude, actuation occurs only when the first predetermined level is reached or exceeded.

Another way of expressing the action of the amplifier 34 and rectifier 36 on the relay 32 is that: with an error signal greater than the first predetermined amplitude, the relay is actuated and the contacts assume one condition; with an error signal less than the second predetermined amplitude (which is less than the first) the relay is non-actuated and the contacts assume the other condition, and with an error signal in the range between these two amplitudes, the relay is actuated or non-actuated according to whether it was last actuated or non-actuated before the error signal came within this range. It is clear that when the error signal amplitude is within the range between the two predetermined levels, the relay contacts assume whichever condition they were in before the error signal last entered the range between the two predetermined amplitudes.

The operation of the circuit in the absence of actuation of the rate feedback control relay 32 has already been described and will be understood by those skilled in the art from what has been said. When the rate feedback control relay 32 is actuated, the normally closed contacts 32a and 32b are open. As a result, the resistors 40 and 42 are no longer short circuited but are effectively in series with the path of the error signal from terminals A and B of terminal block 38. These resistors therefore attenuate the error signal to a degree depending upon their resistance values relative to the impedance presented by the following filter circuit. This action has been heretofore mentioned. At the same time the normally open contacts 32e and 32f cause a pair of resistors 260 and 260a to be shunted across the capacitors 168 and 168a. These resistors 260 and 260a are for the purpose of allowing a further reduction in the effective gain of the error signal by increasing the rate feedback signal at 51 and 51a. The amplitude of this feedback signal is determined by the slewing speed.

The switch 33 is manually operated. It is used to change the characteristics of the filter associated with capacitors 168, 168a, 170, and 170a by shorting the capacitors 170 and 170a out of circuit when the switch is closed, or re-inserting them when the switch is open. In the particular circuit illustrated, the position of switch 33 is selected in accordance with which one of a pair of mechanical loads is to be driven.

The circuit values are selected in such a manner that the level or amplitude at which the error signal causes the rate feedback control relay 32 to be actuated is above the level which causes saturation of the three stages of amplifiers 12, 14, and 16. Moreover, the values are selected so that even after the rate feedback control relay has been actuated and notwithstanding the increase in the feedback of the rate signal, the amplifier remains at or near saturation. Therefore, a rapid slewing speed is obtained. However, the second predetermined level of error signal (that which causes the rate feedback relay to be deactuated) is below that which with the increase feedback of the rate signal and the decreased or attenuated application of the error signal to the amplifiers 12, 14, and 16 causes these amplifiers to saturate. As the error signal declines from the value which has actuated the rate feedback relay and before it reaches the second predetermined value at which the relay is deactuated as the error signal declines, the attenuation of the error signal and the increased feedback of the rate signals are effective as applied to the motor control circuit, and are not ineffective because of amplifier saturation. Therefore, the increased rate signal feedback and decreased error signal tend to reduce the motor (and load) speed before the position of equilibrium is reached and before return to normal operation. Due to this reduced speed, when normal operation is resumed, the motor and load may be brought to equilibrium position without oscillations resulting from the high speed slewing action.

F. Specific circuit

In one apparatus constructed according to the invention and using the specific circuit as shown, the predetermined level at which the rate feedback control relay is actuated corresponds to error signals of 10 degrees. For error signals corresponding to less than 10 degrees the servo system operates in a conventional manner. For error signals corresponding to more than 10 degrees, the rate feedback control relay 32 is actuated. The circuit values are selected so that the synchro gain (which may be defined as the gain of the servo system without rate feedback) is reduced to 25 per cent of its original value on actuation of the rate relay 32 thereby applying increased negative feedback to the error signal while slewing. This effective reduction in error signal and increase in rate feedback does not affect the acceleration and running speed of the servomotor 20, as the saturation level of the servo is about one-half degree error without the reduction of gain or attenuation of signal as a result of the relay actuation. However, the servo system deceleration action is more rapid because of braking action of motor 20. This braking action, because of actuation of the relay, and the increase of the rate feedback, and reduction of the error signal, is now applied sufficiently before equilibrium position to prevent over-shoot. The relay is deactivated when the error signal is decreased from the value of about 10 degrees which has caused actuation of the relay to an error signal corresponding to near, say, two degrees. Thus for a few degrees, the anticipation afforded by the increased rate feedback with a decelerating action is effective. The deactivation of the relay causes the synchro gain to be brought back to normal and the relay 32 deactuated, and the rate feedback loop returned to its normal circuit values. As a result, the action of the servo in reaching its equilibrium position is as though the rate feedback control relay had not been actuated. A 10 degree error is much larger than that ordinarily encountered in normal operation of the servo as an automatic tracking system or as a follow-up system to track airplanes manually. Therefore, no serious performance criteria is sacrificed for the improvement in slewing time. It will be understood that the servo system may be used for automatic tracking purposes, as well understood by those skilled in the art, by the requisite modifications for securing an automatic tracking error signal if, for example, this apparatus were to be used in a radar (radio echo detection range) system. In the circuit according to the invention here illustrated, the time required for slewing an antenna load in a radar system may be taken as a suitable example of the performance results which may be secured. The slewing time for turning one antenna through 180 degrees of azimuth without the benefits of the invention was 8½ seconds with some oscillations. By using the invention the slewing time for a 180 degree error was reduced to 4½ seconds with no overshoot. For the benefit of those who wish to duplicate the apparatus here disclosed, and in order to make this disclosure of the invention as complete as possible, there is appended hereto a table showing tube types, resistance, and capacitance values, and other details which may be required by those who wish to build a similar apparatus. It will be understood, however, that such values are given by way of example rather than by way of limitation. It will also be understood that, although not shown throughout, suitable transformers or other voltage supplies may be employed for the heater and filament currents and suitable rectifiers may be employed to provide the various direct current voltage supplies.

It will be apparent that the servo system here disclosed has advantageous operating qualities in providing quick response to large error signals without overshoot and without extended oscillations.

TABLE OF VALUES FOR SPECIFIC CIRCUIT

In ohms
K—indicates thousands
M—indicates millions

Resistors:

| | |
|---|---|
| 40; 42 | 33 K |
| 44; 46 (potentiometers) | 12 K |
| 50; 50a | 47 K |
| 54; 54a | 270 K |
| 56, 56a; 204 | 820 K |
| 62; 62a; 72; 72a; 92; 92a; 100; 100a; 200; 214; 222; 222a | 220 K |
| 66; 250 | 2,200 |
| 68 | 15 K |
| 70 | 56 K |
| 82; 82a; 172; 172a; 233 | 470 K |
| 86; 86a | 820 |
| Resistor of comb. 118 and 118a (ea.); 246; 260; 260a | 150 K |
| 104 | 27 |
| 115 and 115a (ea. resistor) | 68 K |
| 146 | 50 |
| 153; 153a (ea. resistor) | 100 |
| 156 | 10 |
| 160; 160a | 1000 |
| 166; 166a | 330 K |
| 182; 190; 240; 242 | 100 K |
| 184 (pot.) | 250 K |
| Resistor of comb. 220 | 2.2 M |
| 212 | 1,500 |
| 215 | 82 K |
| 216 | 1 M |
| Res. of comb. 234; 244 | 3,300 |

Capacitors: (Mmf. unless otherwise stated)

| | |
|---|---|
| 52; 52a; 152; 152a; 180; 260 mf | .01 |
| 55 | 680 |
| 57 | 220 |
| 73; 116; 217 mf | 1 |
| 76; 76a; 94; 94a; 232 | 6,800 |
| Cap. of comb. 118 and 118a (ea); 202; 218 | 1000 |
| 158; 158a mf | .04 |
| 140 (total parallel capacity) mf | 94 |
| 138 mf | 37 |
| 168; 168a; 170; 170a; cap. of comb. 234; 252 mf | 0.5 |
| 178 | 3,300 |
| 196 | 2,200 |
| Cap. of comb. 220 | 270 |

Tubes, No.:

| | Type |
|---|---|
| 60 | 12A7 |
| 80 | 12A7 |
| 98 | 5881 |
| 98a | 5881 |
| 148 and 148a | 100TH |
| 194 | 12A7 |
| 224 | 12AU7 |
| 254 | 6AL5W |

Transformers 110; 110a each had turns ratio, primary to secondary, of 2.2 to 1. Operating frequency 366 to 455 C. P. S. Primary resistance 120 ohms maximum. Secondary resistance 30 ohms maximum. Minimum primary impedance 8,000 ohms at 400 C. P. S. Transformer 120 (120a was similar to 120) was rated as follows: primaries 122 and 124 at 200 volts peak each, 6.5 amps. R. M. S. (peak 12 amp. R. M. S.). Secondary 430 volts peak, from tap (connected to junction 44) to one terminal (connected to transformer 110) and 16 kilovolts to the other terminal (connected to tubes 148 anodes). Turns ratio, either primary to secondary (from tap to other terminal for greater voltage) 1 to 59. Either primary to secondary (from tap to one terminal for lower voltage) 1 to 1.57. For a different operating condition another tap, between the first tap and the one terminal, was provided. The turns ratio of either primary to secondary from this second tap to the one transformer terminal, was 1 to 1.45. Open circuit impedance of either primary at least 50 ohms with 120 volts applied to the measured winding. With the secondary short circuited (across the first tap and the other terminal) the impedance of the primaries connected in series (aiding relationship) was 2 ohms maximum, with 4 amps. A. C. flowing through the primaries.

The motor is a two-phase control motor 115 volts, 400 cycle, 400 watts output; efficiency at rated output 40%; synchronous speed 4000 R. P. M.; minimum locked torque 330 ounce-inches.

What is claimed is:

1. The combination comprising a servoamplifier responsive to an error signal applied thereto and which in normal operation is subject to saturation, an attenuating circuit, and means connected to receive said error signal and responsive thereto to connect said attenuating circuit into said amplifier to attenuate said error signal applied to said amplifier when said error signal is in excess of a predetermined amplitude in excess of the amplitude which in normal operation causes amplifier saturation, and to disconnect said attenuating circuit to restore said servoamplifier to normal operation when said error signal is less than a second predetermined amplitude less than the first predetermined amplitude.

2. The combination comprising a servoamplifier responsive to an error signal applied thereto and which in normal operation is subject to saturation, an attenuating circuit, a rate feed-back circuit connected to apply to said amplifier a rate feed-back signal to modify said error signal, a rate feed-back impedance, and means connected to receive said error signal and responsive thereto when said error signal is in excess of a predetermined amplitude in excess of the amplitude which in normal operation causes amplifier saturation to connect said attenuating circuit in said amplifier to attenuate said error signal applied to said amplifier and simultaneously to connect said impedance in said rate feed-back circuit to increase the rate feed-back signal modifying said error signal.

3. The combination comprising a servoamplifier responsive to an error signal applied thereto and which in normal operation is subject to saturation, a rate feedback circuit connected to apply to said amplifier a rate feed-back signal to modify said error signal, a rate feed-back impedance, and means connected to receive said error signal and responsive thereto when said error signal is in excess of a predetermined amplitude in excess of the amplitude which in normal operation causes amplifier saturation, to connect said impedance into said rate feedback circuit to increase the rate feed-back signal modifying said error signal.

4. The combination claimed in claim 1, said means comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitudes assumes whichever condition assumed before the error signal last entered said range.

5. The combination comprising a reversible motor, a load positioned by said motor, a position control element, means to derive an error signal having an amplitude and sense corresponding to the lack of positional correspondence between said element and said load, a servoamplifier connected to have said error signal applied thereto and responsive to said error signal and connected to said motor, said amplifier controlling said motor to drive the load into positional correspondence with said element, said servoamplifier in normal operation being subject to saturation, an attenuating circuit, means connected to derive a signal proportional to the rate of motion of said load and to apply said rate signal in feed-back to modify said error signal, said rate feed-back means including a circuit, a rate feed-back impedance, and means connected to receive said error signal and responsive thereto when said error signal is in excess of the amplitude which in normal operation causes amplifier saturation to connect said attenuating circuit in said amplifier to attenuate said error signal applied to said amplifier and simultaneously to connect said impedance in said rate feedback circuit to increase the rate feed-back signal modifying said error signal.

6. The combination comprising a reversible motor, a load positioned by said motor, a position control element, means to derive an error signal having an amplitude and sense corresponding to the lack of positional correspondence between said element and said load, a servo amplifier connected to have said error signal applied thereto and responsive to said error signal and connected to said motor, said amplifier controlling said motor to drive the load into positional correspondence with said element, said servo amplifier in normal operation being subject to saturation, means connected to derive a signal proportional to the rate of motion of said load and to apply said rate signal in feed-back to modify said error signal, said rate feed-back means including a circuit, a rate feed-back impedance, and means connected to receive said error signal and responsive thereto when said error signal is in excess of a predetermined amplitude in excess of the amplitude which in normal operation causes amplifier saturation to connect said rate feed-back impedance in said rate feed-back circuit to increase the rate feed-back signal modifying said error signal.

7. The combination claimed in claim 6, said means to connect said attenuating circuit comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitude assumes whichever condition assumed before the error signal last entered said range.

8. The combination comprising a reversible motor, a load positioned by said motor, a position control element, means to derive an error signal having an amplitude and sense corresponding to the lack of positional correspondence between said element and said load, a servo amplifier connected to have said error signal applied thereto and responsive to said error signal and connected to said motor, said amplifier controlling said motor to drive the load into positional correspondence with said element, said servo amplifier in normal operation being subject to saturation, an attenuating circuit, and means connected to receive said error signal and responsive thereto to connect said attenuating circuit into said amplifier to attenuate said error signal applied to said amplifier when said error signal is in excess of a predetermined amplitude in excess of the amplitude which in normal operation causes amplifier saturation, said means to connect said attenuating circuit comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitudes assumes whichever condition assumed before the error signal last entered said range.

9. The combination claimed in claim 5, said means to connect said attenuating circuit and to connect said rate feed-back impedance comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitudes assumes whichever condition assumed before the error signal last entered said range.

10. The combination claimed in claim 3, said means to connect said rate feed-back impedance comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitudes assumes whichever condition assumed before the error signal last entered said range.

11. The combination claimed in claim 2, said means to connect said attenuating circuit and said rate feedback impedance comprising a switch means having two conditions, a control circuit connected to receive said error signal and controlling said switch means in response thereto so that the said means assume one condition when said error signal exceeds said first predetermined amplitude and assumes the other condition when said error signal is less than said second predetermined amplitude, and for error signals in the range between said predetermined amplitudes assumes whichever condition assumed before the error signal last entered said range.

12. The combination claimed in claim 1, said means comprising a relay having a winding, and a relay control circuit comprising a pair of amplifying elements having said relay winding as at least part of a common load impedance, the said relay control circuit being connected to have said error signal applied as an input signal to one of said elements, means including a rectifier to supply a bias to the other of said elements in preference to the one, the said bias being sufficient in the absence of input signal to cut-off said other amplifying element, said rectifier being connected to receive the output signal developed across said common load impedance of said amplifying elements and providing a change of bias in response thereto which is in opposition to said cut-off bias, and a regenerative feed-back path from said output impedance to the input of said other element.

13. The combination claimed in claim 1, said second predetermined amplitude being less than said amplitude causing amplifier saturation.

14. The combination claimed in claim 8, said second predetermined amplitude being less than said amplitude which causes amplifier saturation.

15. In a servo system of the type including a circuit providing a damping signal of sufficient amplitude to permit relatively quick response with a minimum of overshoot to an error signal of relatively small magnitude but of insufficient amplitude to prevent a substantial amount of overshoot in response to an error signal of relatively large magnitude, whereby the response time of said system to said error signal of relatively large magnitude is relatively long, the method of substantially reducing the response time of said system to an error signal of relatively large magnitude comprising the step of substantially increasing the relative amplitude of the damping signal with respect to the error signal immediately prior to the time the system approaches zero error.

16. In a servo system of the type including a circuit providing a damping signal of sufficient amplitude to permit relatively quick response with a minimum of overshoot to an error signal of relatively small magnitude but of insufficient amplitude to prevent a substantial amount of overshoot in response to an error signal of relatively large magnitude, whereby the response time of said system to said error signal of relatively large magnitude is relatively long, the method of substantially reducing the response time of said system to an error signal of relatively large magnitude comprising the step of substantially increasing the amplitude of said damping signal and substantially decreasing the amplitude of said error signal immediately prior to the time the system approaches zero error.

17. In a servo system of the type including a circuit providing a damping signal of sufficient amplitude to permit relatively quick response with a minimum of overshoot to an error signal of relatively small magnitude but of insufficient amplitude to prevent a substantial amount of overshoot in response to an error signal of relatively large magnitude, whereby the response time of said system to said error signal of relatively large magnitude is relatively long, the method of substantially reducing the response time of said system to an error signal of relatively large magnitude comprising the steps of substantially increasing the relative amplitude of the damping signal with respect to the error signal when the error signal exceeds a predetermined magnitude, and reducing the ratio of the amplitude of the damping signal to the error signal to its normal value when the system error approaches another smaller magnitude.

18. In a servo system of the type including a circuit providing a damping signal of sufficient amplitude to permit relatively quick response with a minimum of overshoot to an error signal of relatively small magnitude but of insufficient amplitude to prevent a substantial amount of overshoot in response to an error signal of relatively large magnitude, whereby the response time of said system to said error signal of relatively large magnitude is relatively long, an arrangement for substantially reducing the response time of said servo system to an error signal of relatively large magnitude comprising feedback means including an output circuit electrically connected to said circuit providing a damping signal, and an input circuit connected to receive said error signal, for substantially increasing the magnitude of said damping signal with respect to said error signal immediately prior to the time said system approaches zero error, in response to an error signal of greater than a predetermined magnitude.

19. In a servo system as set forth in claim 18, the damping signal path including capacitor means in series circuit therewith, said arrangement for substantially reducing the response time of said system to an error signal of relatively large magnitude including impedance means, means responsive to an error signal of greater than a predetermined magnitude for effectively connecting said impedance means in series with the error signal path for substantially reducing the amplitude of said error signal, and means responsive to said error signal of greater than said predetermined magnitude for effectively shunting said capacitor means, whereby the direct voltage level of said damping signal is substantially increased.

20. In a servo system, in combination, a source of error signal; driving means; amplifying means connecting said source to said driving means for energizing said driving means; a damping circuit for producing a damping signal having a parameter proportional to the speed of said driving means; circuit means for connecting said damping circuit to said amplifying means in opposition to said error signal, whereby said damping signal has a damping effect on the speed of said driving means; and means for substantially increasing the magnitude of said damping signal applied to said amplifying means during a period immediately prior to the time said driving means approaches a position of zero error, to prevent said driving means from substantially overshooting said position of zero error.

21. In a servo system, in combination, a source of error signal; driving means; amplifying means connecting said source to said driving means for energizing said driving means; a damping circuit for producing a damping signal having a parameter proportional to the speed of said driving means; circuit means for connecting said damping circuit to said amplifying means in opposition to said error signal, whereby said damping signal has a damping effect on the speed of said driving means; and means responsive to an error signal of greater than a predetermined magnitude for substantially increasing the magnitude of said damping signal applied to said amplifying means during a period immediately prior to the time said driving means approaches a position of zero error, whereby said driving means is substantially prevented from overshooting said position of zero error.

22. In a servo system, in combination, a source of error signal; a motor; amplifying means connecting said source to said motor for driving the latter; a damping circuit connected to said motor for producing a damping signal having an amplitude proportional to the speed of said motor; circuit means for connecting said damping circuit to said amplifying means in opposition to said error signal, whereby said damping signal has a damping effect on the speed of said motor; and means responsive to an error signal of greater than a predetermined magnitude for substantially increasing the amplitude of said damping signal with respect to said error signal immediately prior to the time said motor aproaches a position of zero error whereby said driving means is substantially prevented from overshooting said position of zero error.

23. In a servo system as set forth in claim 22, and last-named means including means for substantially attenuating said error signal applied to said amplifying means.

24. In a servo system as set forth in claim 22, said last-named means including means for substantially attenuating said error signal applied to said amplifying means, and means for substantially increasing the amplitude of said damping signal.

25. In a servomotor system having an input responsive to a condition to be controlled for producing a control signal, servo amplifier means responsive to said control signal for producing an amplified control signal, servomotor means responsive to said amplified control signal to control said condition, and damping generator means responsive to the rate of change of position of said servomotor to vary the effect of said control signal upon said servomotor, an improved means for reducing the response time of said servomotor to a rapid change of said condition comprising; a circuit connected to receive said control signal and including means connecting the output thereof to the input of said servo amplifier for substantially reducing the amplitude of said amplified control signal in response to a control signal of greater than a predetermined amplitude.

26. In a servomotor system having an input responsive to a condition to be controlled for producing a control signal, servo amplifier means responsive to said control signal for producing an amplified control signal, servomotor means responsive to said amplified control signal to control said condition, and damping generator means responsive to the rate of change of position of said servomotor to vary the effect of said control signal upon said servomotor, an improved means for reducing the response time of said servomotor to a rapid change of said condition comprising; a circuit connected to receive said control signal and including means connecting the output thereof to both said servo amplifier means and said damping generator means for substantially reducing the amplitude of said amplified control signal and substantially increasing the output of said damping generator means in response to a control signal of greater than a predetermined magnitude.

27. Motor control apparatus comprising, in combination, a control signal source; a controlled motor; amplifying means connecting said source in a driving relation to said controlled motor; means for producing a speed signal proportional to the speed of said controlled motor; and means for applying said speed signal to said amplifying means in opposition to said control signal, said last-named means comprising a circuit for substantially increasing the effect of said speed signal non-linearly with time in response to a control signal of greater than a predetermined magnitude.

28. Motor control apparatus comprising, in combination, a control signal source; a controlled motor; amplifying means connecting said source in a driving relation to said controlled motor; means for producing a speed signal proportional to the speed of said controlled motor; and means for applying said speed signal to said amplifying means in opposition to said control signal, said last-named means including a circuit responsive to a control signal of greater than a predetermined magnitude for substantially increasing the effect of said speed signal with respect to said control signal.

29. Motor control apparatus comprising, in combination, a control signal source; a controlled motor; amplifying means connecting said source in a driving relation to said controlled motor; means for producing a speed signal proportional to the speed of said controlled motor; means for applying said speed signal to said amplifying means in opposition to said control signal; and means responsive to a control signal of greater than a predetermined magnitude for substantially reducing the effect of said control signal and substantially increasing the effect of said speed signal during at least the period immediately prior to the time said controlled motor approaches a position of zero error, whereby said motor is substantially prevented from overshooting said position of zero error.

References Cited in the file of this patent

UNITED STATES PATENTS

| | | |
|---|---|---|
| 2,401,421 | Hahn | June 4, 1946 |
| 2,654,999 | Berge | Oct. 13, 1953 |
| 2,674,708 | Husted | Apr. 6, 1954 |

OTHER REFERENCES

"Servo Mechanism Fundamentals," Lauer, Lesnick, Matson, McGraw-Hill, New York, 1947, p. 35, Fig. 2.15.